(12) United States Patent
Terlep et al.

(10) Patent No.: US 12,269,725 B2
(45) Date of Patent: Apr. 8, 2025

(54) CONTINUOUS MULTI-STREAM LIQUID PRODUCT DEAERATION SYSTEM AND METHOD

(71) Applicant: Statco Engineering & Fabricators LLC, Huntington Beach, CA (US)

(72) Inventors: George Terlep, Creve Coeur, MO (US); Gregory Collier, Wildwood, MO (US)

(73) Assignee: STATCO ENGINEERING & FABRICATORS LLC, Huntington Beach, CA (US)

( * ) Notice: Subject to any disclaimer, the term of this patent is extended or adjusted under 35 U.S.C. 154(b) by 146 days.

(21) Appl. No.: 17/894,638

(22) Filed: Aug. 24, 2022

(65) Prior Publication Data

US 2023/0093179 A1 Mar. 23, 2023

Related U.S. Application Data

(60) Provisional application No. 63/246,434, filed on Sep. 21, 2021.

(51) Int. Cl.
*B67C 3/28* (2006.01)
*A23L 2/42* (2006.01)
(Continued)

(52) U.S. Cl.
CPC ............... *B67C 3/286* (2013.01); *A23L 2/42* (2013.01); *A23L 2/54* (2013.01); *A23L 3/3418* (2013.01);
(Continued)

(58) Field of Classification Search
CPC ........... B67C 3/286; B67C 3/023; B67C 3/20; B67C 3/222; A23L 2/42; A23L 2/54; A23L 3/3418; B01F 23/29; B01F 35/83
See application file for complete search history.

(56) References Cited

U.S. PATENT DOCUMENTS

| | | | | |
|---|---|---|---|---|
| 4,350,503 A | * | 9/1982 | Skoli | A23L 2/54 426/477 |
| 4,599,239 A | * | 7/1986 | Wieland | A23L 2/54 426/590 |

(Continued)

OTHER PUBLICATIONS

International Searching Authority, International Search Report and Written Opinion mailed Dec. 30, 2022, 11 pages.

*Primary Examiner* — Nicolas A Arnett
(74) *Attorney, Agent, or Firm* — THOMPSON HINE LLP

(57) ABSTRACT

A system for deaeration of constituents of a liquid product blend includes a first liquid stream supply system and a second liquid stream supply system. A control system is configured to: (i) monitor flow of the first liquid and responsively/automatically control flow of the first deaeration gas in order to achieve a first target ratio of first deaeration gas to first liquid; and/or (ii) monitor flow of the second liquid and responsively/automatically control flow of the second deaeration gas in order to achieve a second target ratio of second deaeration gas to second liquid; and/or (iii) monitor a dissolved oxygen level of (a) the first liquid, at a location downstream of injection of the first deaeration gas, and (b) a combined liquid formed by mixing the first liquid and the second liquid, and to adjust the system based upon the dissolved oxygen level of the combined liquid.

10 Claims, 1 Drawing Sheet

(51) Int. Cl.
    *A23L 2/54*         (2006.01)
    *A23L 3/3418*     (2006.01)
    *B01F 23/20*      (2022.01)
    *B01F 35/83*      (2022.01)
    *B67C 3/02*       (2006.01)
    *B67C 3/20*       (2006.01)
    *B67C 3/22*       (2006.01)

(52) U.S. Cl.
    CPC .............. *B01F 23/29* (2022.01); *B01F 35/83* (2022.01); *B67C 3/023* (2013.01); *B67C 3/20* (2013.01); *B67C 3/222* (2013.01)

(56) References Cited

U.S. PATENT DOCUMENTS

| | | | | |
|---|---|---|---|---|
| 4,715,398 A * | 12/1987 | Shouldice | ........... | A61M 1/1662 |
| | | | | 95/193 |
| 5,112,357 A * | 5/1992 | Bjerklund | .......... | B01D 19/0005 |
| | | | | 95/266 |
| 5,656,313 A * | 8/1997 | Gibney | ................ | B67D 1/0016 |
| | | | | 426/231 |
| 6,186,193 B1 * | 2/2001 | Phallen | ..................... | B65B 3/30 |
| | | | | 222/64 |
| 6,251,167 B1 * | 6/2001 | Berson | ............... | B01D 19/0005 |
| | | | | 95/263 |
| 7,329,312 B2 * | 2/2008 | Morita | ............... | B01C 35/2211 |
| | | | | 95/1 |
| 8,271,139 B2 * | 9/2012 | Bellafiore | ............... | B01F 35/82 |
| | | | | 700/265 |
| 8,438,969 B2 * | 5/2013 | Gold | .................... | B01F 23/2362 |
| | | | | 261/DIG. 7 |
| 8,479,784 B2 * | 7/2013 | Goldman | ............. | B67D 1/0044 |
| | | | | 141/144 |
| 8,974,111 B2 * | 3/2015 | Phallen | ............... | B01F 35/8311 |
| | | | | 366/181.8 |
| 9,394,153 B2 * | 7/2016 | Goldman | ............... | B67C 3/208 |
| 9,499,382 B2 * | 11/2016 | Newman | ............... | B67D 1/0041 |
| 10,099,911 B2 * | 10/2018 | Goldman | ................ | B67C 3/007 |
| 10,260,918 B2 * | 4/2019 | Liu | ........................ | G05D 11/00 |
| 10,280,060 B2 * | 5/2019 | van Opstal | .......... | B67D 1/0043 |
| 10,674,749 B2 * | 6/2020 | Lucas | ....................... | A23L 2/54 |
| 11,262,769 B2 * | 3/2022 | Choubak | ............. | B01F 35/2209 |
| 11,338,081 B2 * | 5/2022 | Mustapha | ......... | B01F 33/50111 |
| 11,347,245 B2 * | 5/2022 | Choubak | ............. | G05D 11/137 |
| 2017/0361286 A1 * | 12/2017 | Kremer | ................. | F22B 37/025 |
| 2018/0020700 A1 * | 1/2018 | Lucas | ................... | B01F 23/703 |
| | | | | 426/487 |
| 2020/0281230 A1 * | 9/2020 | Lucas | .................... | B01F 23/703 |

* cited by examiner

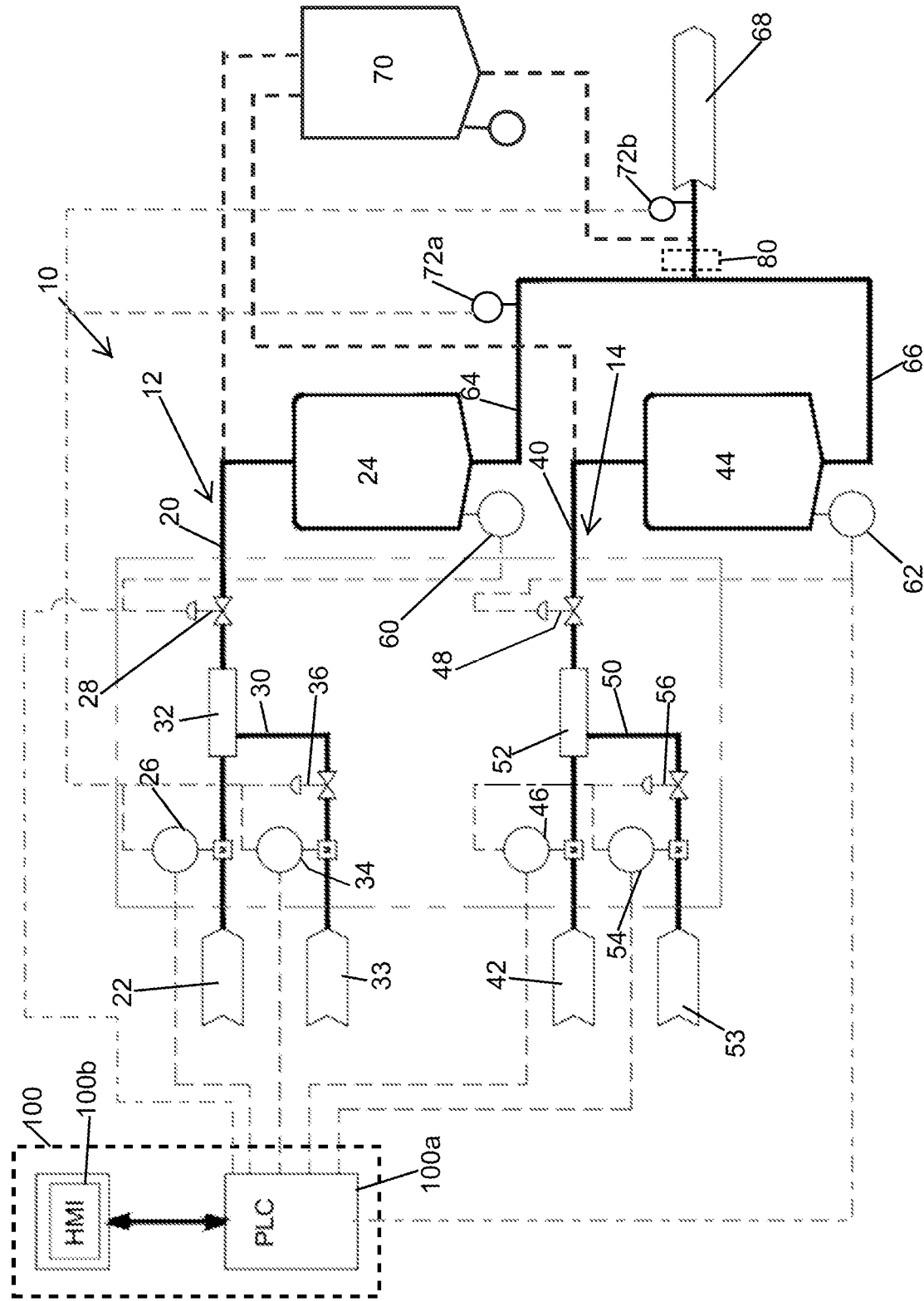

CONTINUOUS MULTI-STREAM LIQUID PRODUCT DEAERATION SYSTEM AND METHOD

TECHNICAL FIELD

This application relates generally to deaeration of beverage products and, more specifically, to a system and method for multi-stream liquid product deaeration.

BACKGROUND

Beverages are commonly packaged into containers using high speed blending and filling systems and are made up of various components, such as water and one or more syrups, that are blended to provide a consistent product that is filled into containers. Carbonated beverages, such as soft drinks, also incorporate a carbonation step in which $CO_2$ is dissolved into the beverage. Levels of dissolved oxygen and nitrogen within the product blend should be low to avoid excess foaming during filling. Dissolved oxygen in the containerized product can also adversely impact product taste and shelf life.

Systems exist for deaeration of the product prior to filling, in an attempt to reduce dissolved oxygen and nitrogen within the final product. For example, venting of the final product blend is known, such as by using an atmospheric vessel upstream of the product storage tank that is used for filling, per U.S. Pat. No. 10,674,749. This system requires an additional tank, pump and deaeration elements for final deaeration, which increases total cost of ownership and also increases overall footprint of the system. Such systems are typically comprised of deaeration gas sources that are un-metered and thereby lack controlled consistency in terms of results achieved.

It would be desirable to provide an improved system for achieving more consistent deaeration results in the product beverage space, or other sectors requiring liquid deaeration.

SUMMARY

In one aspect, continuous feedback based control of deaeration gas into multiple flowing liquid streams is used to provide target ratios of deaeration gas to liquid for each of the liquids, enabling consistent deaeration to be achieved.

In another aspect, a system for deaeration of constituents of a liquid product blend includes a first liquid stream supply system comprising a first liquid stream flow path, and a first deaeration gas flow path intersecting the first liquid stream flow path for injecting a first deaeration gas into the first liquid as the first liquid flows along the first liquid stream flow path; and a second liquid stream supply system comprising a second liquid stream flow path, and a second deaeration gas flow path intersecting the first liquid stream flow path for injecting a second deaeration gas into the second liquid as the second liquid flows along the second liquid stream flow path. A control system is configured to: (i) monitor flow of the first liquid and responsively and automatically control flow of the first deaeration gas in order to achieve a first target ratio of first deaeration gas to first liquid; and/or (ii) monitor flow of the second liquid and responsively and automatically control flow of the second deaeration gas in order to achieve a second target ratio of second deaeration gas to second liquid; and/or (iii) monitor a dissolved oxygen level of (a) the first liquid, at a location downstream of injection of the first deaeration gas, and (b) a combined liquid formed by mixing the first liquid and the second liquid, and to adjust the system based upon the dissolved oxygen level of the combined liquid.

In a further aspect, a method of producing a beverage product blend involves the steps of: a) monitoring flow of a first liquid of the product blend and responsively and automatically varying an injection rate of first deaeration gas into the flowing first liquid so as to maintain a first target ratio of first deaeration gas to first liquid; and b) monitoring flow of a second liquid of the product blend and responsively varying a deaeration gas injection rate into the flowing second liquid so as to maintain a second target ratio of second deaeration gas to second liquid.

In yet another aspect, a system for deaeration of constituents of a liquid product blend includes a first liquid stream supply system comprising: a first liquid stream flow path from a first source of a first liquid to an atmospheric tank for the first liquid; a first liquid flow meter for detecting liquid flow along the first liquid stream flow path; a first liquid flow control device located long the first liquid stream flow path for selectively controlling a flow rate along the first liquid stream flow path; a first deaeration gas flow path intersecting the first liquid stream flow path for injecting a first deaeration gas into the first liquid as the first liquid flows along the first liquid stream flow path; a first gas flow meter for detecting gas flow along the first deaeration gas flow path; and a first gas flow control device located long the first deaeration gas flow path for selectively controlling a flow rate along the first deaeration gas flow path. A controller is operatively connected to each of the first liquid flow meter, the first liquid flow control device, the first deaeration gas flow meter, and the first deaeration gas flow control device, wherein the controller is configured to: (i) during flow of the first liquid, operate the first deaeration gas flow control device based upon feedback from both the first liquid flow meter and the first deaeration gas flow meter in order to achieve a first target ratio of first deaeration gas to first liquid.

The details of one or more embodiments are set forth in the accompanying drawings and the description below. Other features, objects, and advantages will be apparent from the description and drawings, and from the claims.

BRIEF DESCRIPTION OF THE DRAWINGS

The drawing shows a schematic depiction of a deaeration system.

DETAILED DESCRIPTION

Referring to the drawing, a schematic depiction a system 10 for deaeration of constituents of a liquid product blend, which system includes a first liquid stream supply system 12 and a second liquid supply stream system 14.

The first liquid supply stream system 12 includes a first liquid stream flow path 20 from a first source 22 of a first liquid to a first atmospheric tank 24 for the first liquid. A first liquid flow meter 26 is provided for detecting liquid flow along the first liquid stream flow path, and a first liquid flow control device 28 is located long the first liquid stream flow path 20 for selectively controlling a flow rate along the first liquid stream flow path. A first deaeration gas flow path 30 intersects the first flow path (e.g., vias a gas injector 32, such as a sparger) for injecting a first deaeration gas from a supply 33 into the first liquid as the first liquid flows along the first liquid stream flow path 20. A first gas flow meter 34 is provided for detecting gas flow along the first deaeration gas flow path, and a first gas flow control device 36 is located along the first deaeration gas flow path 30 for selectively controlling a flow rate along the first deaeration gas flow path 30.

The second liquid stream supply system 14 includes a second liquid stream flow path 40 from a second source 42 of a second liquid to a second atmospheric tank 44 for the second liquid. A second liquid flow meter 46 is provided for detecting liquid flow along the second liquid stream flow path, and a second liquid flow control device 48 is located long the second liquid stream flow path 40 for selectively controlling a flow rate along the second liquid stream flow path. A second deaeration gas flow path 50 intersects the second flow path (e.g., vias a gas injector 52, such as a sparger) for injecting a second deaeration gas from a second supply 53 into the second liquid as the second liquid flows along the second liquid stream flow path. A second gas flow meter 54 is provided for detecting gas flow along the second deaeration gas flow path, and a second gas flow control device 56 is located long the second deaeration gas flow path 50 for selectively controlling a flow rate along the second deaeration gas flow path 50.

By way of example, the flow control devices 28, 36, 48 and 56 may be configured as in-line flow control valves of the back pressure/throttling type. However, other flow control device types could be used. The flow meters 26, 34, 46 and 54 may be in-line flow meters.

A controller 100 is operatively connected to each of the first liquid flow meter 26, the first liquid flow control device 28, the first deaeration gas flow meter 34, the first deaeration gas flow control device 36, the second liquid flow meter 46, the second liquid flow control device 48, the second deaeration gas flow meter 54 and the second deaeration gas flow control device 56. The controller 100 is configured to control the various components on a close-loop feedback basis to achieve a first target ratio of first deaeration gas to first liquid and to achieve a second target ratio of second deaeration gas to second liquid. The target ratios are set according to a desired deaeration affect that is desired for each of the liquids.

More specifically, the controller 100 is configured such that, during flow of the first liquid, the controller continuously operates the first deaeration gas flow control device 36, based upon feedback from both the first liquid flow meter 26 and the first deaeration gas flow meter 34, in order to achieve the first target ratio of first deaeration gas to first liquid. Similarly, the controller 100 is configured such that, during flow of the second liquid, the controller 100 continuously operates the second deaeration gas flow control device 56, based upon feedback from both the second liquid flow meter 46 and the second deaeration gas flow meter 54, in order to achieve the second target ratio of second deaeration gas to second liquid. By providing a continuous feedback arrangement as described, in certain implementations, the system 10 can maintain a target ratio within +/−0.05 vol/vol.

The first atmospheric tank 24 includes an associated first liquid level monitor 60, and the second atmospheric tank 44 includes an associated second liquid level monitor 62. The controller 100 is further configured to control the first liquid flow control device 28, based upon feedback from the first liquid level monitor 60 and the first liquid flow meter 26, to maintain a target liquid level within the first atmospheric tank 24. Likewise, the controller 100 is further configured to control the second liquid flow control device 48, based upon feedback from the second liquid level monitor 62 and the second liquid flow meter 46, to maintain a target liquid level within the second atmospheric tank 44.

By way of example, each of the liquid level monitors 60 and 62 may take the form of one or more liquid level sensors, such as weight sensors or capacitive sensors or hydrostatic level sensors. The target liquid level may be a specific level or may be a range (e.g., between a max and a min).

As shown, the first atmospheric tank 24 includes a first outlet flow path 64, the second atmospheric tank 44 includes a second outlet flow path 66, and the second outlet flow path 66 joins the first outlet flow path 64 to combine the first liquid and the second liquid for downstream processing (e.g., along path 68). In an alternative embodiment, per the dashed line depiction in FIG. 1, a single atmospheric tank 70 could receive both the first liquid and the second liquid (in which case tanks 24 and 44 would not be present in the system).

By way of example, both the first deaeration gas and the second deaeration gas could be the same (e.g., both nitrogen or both $CO_2$). However, the system allows for different deaeration gases to be used for the different liquids. The first liquid could, by way of example, be water, and the second liquid could, by way or example be beverage syrup, but other liquid combinations are possible.

Referring to one exemplary implementation of the control operation in more detail, a control system is composed of (1) the controller 100 (e.g., PLC 100a with associated HMI 100b or other user interface display), (2) the various sensors/detectors 26, 34, 60, 46, 54, 62 and (3) the flow control devices/modulators 28, 36, 48, 56. The human machine interface (HMI) display 100b allows an operator to input values into the controller 100.

The system is designed such that an operator can select a flow rate for the overall system, a liquid level in the atmospheric tank(s), and the level of deaeration required for each liquid. At the beginning of operations, the system is in an empty/idle state. The values noted above are entered into the control system by the operator using the HMI 100b. These values can reside in a recipe stored in controller memory, such that each value is predetermined by product or liquid type. The control system opens the liquid flow valve(s) 28, 48 and allows flow through the liquid stream flow paths. The inline flow meters 26, 46 detect the presence and flow of liquid. Once liquid flow is detected the system uses a closed loop PID control scheme to control each of the flow control devices 28 and 48 to modulate each the liquid streams to set flow rates. The system also monitors the liquid level instruments 60, 62 located in the atmospheric tank(s) and continually provides a second closed loop PID control, for each liquid stream, that controls liquid flow rates based on liquid level in the atmospheric tank(s).

Once liquid flow is detected by the liquid inline flow meters, a third closed loop PID control for each liquid stream is enabled to control the gas injection rate to a preset ratio of liquid and gas based on the level of deaeration desired. The balance or ratio of gas to liquid is critical to maintain the desired deaeration level. If the balance is not correct, the level of deaeration might not be obtained or excess gas might be utilized which leads to wasted utilities.

The exemplary system utilizes totalized volume and mass values to complete its closed loop PID control schemes, such that, not only is the system correcting for errors in the gas and liquid streams instantly and continually, but the system also tracks the totalized volume and mass to assure the correct balance of mixture is always in control even if a slight error presents itself during operations (e.g., adjustments in gas injection are made on the fly as the liquid flow rate varies).

The system may also be designed to monitor dissolved oxygen in the first liquid and/or in the final mixed product stream, prior to packaging, per dissolved oxygen sensors 72a and 72b. The controller 100 is configured such that a cascade loop PID is started to accept feedback from the sensor(s) 72a, 72b and automatically adjust the system (e.g., adjust the flow of the first liquid and/or adjust first target ratio and/or the second target ratio) such that an optimal deaeration level can be maintained, minimizing further possible utility waste. A dissolved oxygen sensor would typically not be utilized directly on the beverage syrup flow path, due to difficulty proper detection of the actual dissolved oxygen level in the beverage syrup.

It is to be clearly understood that the above description is intended by way of illustration and example only, is not intended to be taken by way of limitation, and that other changes and modifications are possible. For example, although the described system includes two liquid flow paths, systems including one or more additional liquid flow paths (e.g., a three liquid system with water, syrup and alcohol base) are also possible. Moreover, the liquids from the two atmospheric tanks 24 and 44 could be combined and delivered to a common buffer tank 80, which may have some overpressure. In such cases, the dissolved oxygen sensor 72b could be located before or after the buffer tank 80. Still other variations are possible.

What is claimed is:

1. Comprising:
   A system for deaeration of constituents of a liquid product blend, a first liquid stream supply system comprising:
   a first liquid stream flow path from a first source of a first liquid to an atmospheric tank for the first liquid;
   a first liquid flow meter for detecting liquid flow along the first liquid stream flow path;
   a first liquid flow control device located long the first liquid stream flow path for selectively controlling a flow rate along the first liquid stream flow path;
   a first deaeration gas flow path intersecting the first liquid stream flow path for injecting a first deaeration gas into the first liquid as the first liquid flows along the first liquid stream flow path;
   a first gas flow meter for detecting gas flow along the first deaeration gas flow path;
   a first gas flow control device located long the first deaeration gas flow path for selectively controlling a flow rate along the first deaeration gas flow path;
   a controller operatively connected to each of the first liquid flow meter, the first liquid flow control device, the first deaeration gas flow meter, and the first deaeration gas flow control device, wherein the controller is configured to:
   (i) during flow of the first liquid, operate the first deaeration gas flow control device based upon feedback from both the first liquid flow meter and the first deaeration gas flow meter in order to achieve a first target ratio of first deaeration gas to first liquid;
   a second liquid supply system including a second liquid stream flow path from a second source of a second liquid, wherein the second liquid is combined with the first liquid to form a combined liquid downstream of a location where the first deaeration gas flow path intersects the first liquid stream flow path;
   wherein the system further includes at least one of:
   (i) a dissolved oxygen sensor positioned to detect a dissolved oxygen level of the combined liquid, formed by mixing of the first liquid and the second liquid downstream of both the first deaeration tank and the second deaeration tank, and wherein the controller is further configured to adjust the system based upon the detected dissolved oxygen level of the combined liquid;
   or
   (ii) a dissolved oxygen sensor positioned to detect a dissolved oxygen level of the first liquid, prior to the first liquid combining with the second liquid, and wherein the controller is further configured to adjust the system based upon the detected dissolved oxygen level of the first liquid.

2. A system for deaeration of constituents of a liquid product blend, comprising:
   a first liquid stream supply system comprising:
   a first liquid stream flow path from a first source of a first liquid to an atmospheric tank for the first liquid;
   a first liquid flow meter for detecting liquid flow along the first liquid stream flow path;
   a first liquid flow control device located long the first liquid stream flow path for selectively controlling a flow rate along the first liquid stream flow path;
   a first deaeration gas flow path intersecting the first liquid stream flow path for injecting a first deaeration gas into the first liquid as the first liquid flows along the first liquid stream flow path;
   a first gas flow meter for detecting gas flow along the first deaeration gas flow path;
   a first gas flow control device located long the first deaeration gas flow path for selectively controlling a flow rate along the first deaeration gas flow path;
   a controller operatively connected to each of the first liquid flow meter, the first liquid flow control device, the first deaeration gas flow meter, and the first deaeration gas flow control device, wherein the controller is configured to:
   (i) during flow of the first liquid, operate the first deaeration gas flow control device based upon feedback from both the first liquid flow meter and the first deaeration gas flow meter in order to achieve a first target ratio of first deaeration gas to first liquid;
   a second liquid stream supply system comprising:
   a second liquid stream flow path from a second source of a second liquid to an atmospheric tank for the second liquid;
   a second liquid flow meter for detecting liquid flow along the second liquid stream flow path;
   a second liquid flow control device located long the second liquid stream flow path for selectively controlling a flow rate along the second liquid stream flow path;
   a second deaeration gas flow path intersecting the second liquid stream flow path for injecting a second deaeration gas into the second liquid as the second liquid flows along the second liquid stream flow path;
   a second gas flow meter for detecting gas flow along the second deaeration gas flow path;
   a second gas flow control device located long the second deaeration gas flow path for selectively controlling a flow rate along the second deaeration gas flow path;
   wherein the controller is operatively connected to the second liquid flow meter, the second liquid flow control device, the second deaeration gas flow meter and the second deaeration gas flow control device, wherein the controller is configured to:

(ii) during flow of the second liquid, operate the second deaeration gas flow control device based upon feedback from both the second liquid flow meter and the second deaeration gas flow meter in order to achieve a second target ratio of second deaeration gas to second liquid.

3. The system of claim 2, wherein the atmospheric tank for the first liquid and the atmospheric tank for the second liquid are a common tank.

4. The system of claim 2, wherein the atmospheric tank for the first liquid is a first atmospheric tank, the atmospheric tank for the second liquid is a second atmospheric tank that is separate from the first atmospheric tank.

5. The system of claim 4, further comprising:
   a first liquid level monitor associated with the first atmospheric tank;
   a second liquid level monitor associated with the second atmospheric tank;
   wherein the controller is further configured to:
   (i) control the first liquid flow control device, based upon feedback from the first liquid level monitor and the first liquid flow meter, to maintain a target liquid level within the first atmospheric tank; and
   (ii) control both the second liquid flow control device, based upon feedback from the second liquid level monitor and the second liquid flow meter, to maintain a target liquid level within the second atmospheric tank.

6. The system of claim 4, wherein the first atmospheric tank includes a first outlet flow path, wherein the second atmospheric tank includes a second outlet flow path, and the second outlet flow path joins the first outlet flow path to combine the first liquid and the second liquid for downstream processing.

7. The system of claim 2, wherein the first deaeration gas is the same as the second deaeration gas.

8. The system of claim 2, wherein the first deaeration gas is different from the second deaeration gas.

9. The system of claim 2, further comprising a dissolved oxygen sensor positioned to detect a dissolved oxygen level of a combined liquid, formed by mixing of the first liquid and the second liquid downstream of both the first deaeration tank and the second deaeration tank, and wherein the controller is further configured to adjust the system based upon the detected dissolved oxygen level of the combined liquid.

10. The system of claim 9, further comprising a dissolved oxygen sensor positioned to detect a dissolved oxygen level of the first liquid, prior to the first liquid combining with the second liquid.

\* \* \* \* \*

UNITED STATES PATENT AND TRADEMARK OFFICE
CERTIFICATE OF CORRECTION

PATENT NO. : 12,269,725 B2
APPLICATION NO. : 17/894638
DATED : April 8, 2025
INVENTOR(S) : George Terlep et al.

Page 1 of 1

It is certified that error appears in the above-identified patent and that said Letters Patent is hereby corrected as shown below:

In the Claims

Column 5, Claim 1, Lines 28-30 read:
"1. Comprising:
A system for deaeration of constituents of a liquid product blend, a first liquid stream supply system comprising:"

They should read:
--1. A system for deaeration of constituents of a liquid product blend, comprising:
a first liquid stream supply system comprising:--

Signed and Sealed this
Third Day of June, 2025

Coke Morgan Stewart
*Acting Director of the United States Patent and Trademark Office*